Sept. 9, 1958    J. R. PERROZZI    2,851,365
CHOCOLATE FOOD COMPOSITION
Filed July 11, 1955
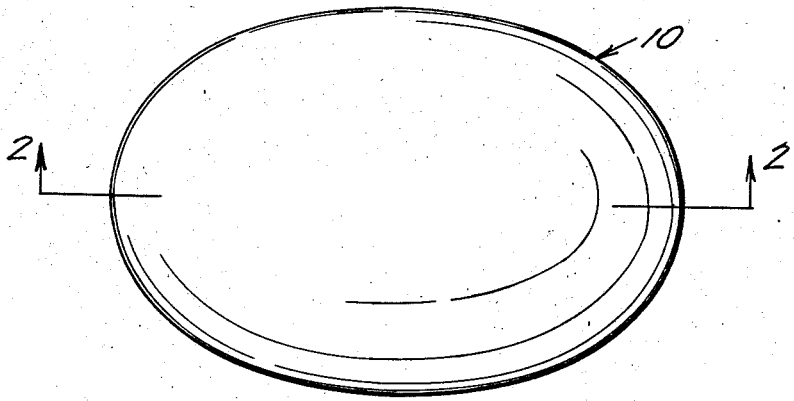
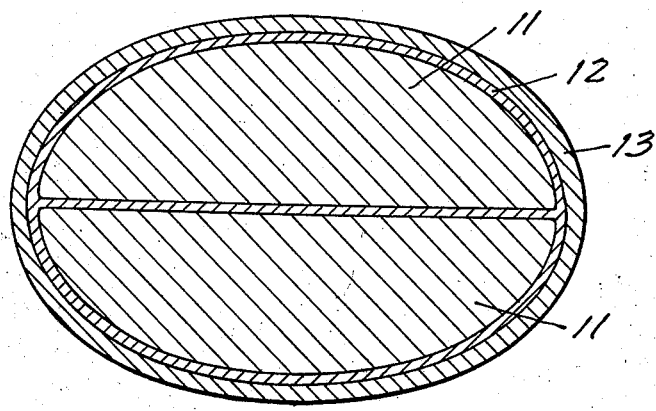
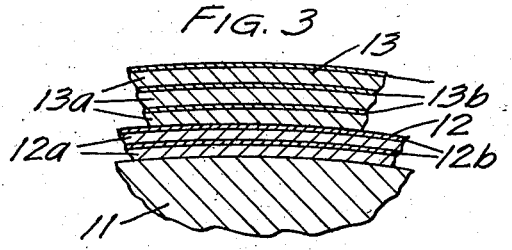
INVENTOR
JOSEPH R. PERROZZI
BY
Williamson, Schroeder, Adams & Meyers
ATTORNEYS р
United States Patent Office 2,851,365
Patented Sept. 9, 1958

2,851,365

CHOCOLATE FOOD COMPOSITION

Joseph R. Perrozzi, Minneapolis, Minn., assignor to Pillsbury Mills, Inc., Minneapolis, Minn., a corporation of Delaware Application July 11, 1955, Serial No. 520,980

6 Claims. (Cl. 99—138)

This invention relates to a chocolate food composition and more particularly to a chocolate bit which is adapted to be incorporated in a pre-mixed food.

The desirability of incorporating discrete particles of chocolate throughout baked food products has been established and such food products include cookies, cakes, puddings and the like. Where the chocolate particles are added to the mix just prior to baking or cooking, the physical form thereof is within the control of the cook, to some extent at least. The chocolate may be caused to blend, marbelize or maintain its discrete form according to when it is incorporated and the manner in which heat is applied to the product. However, when the chocolate particles or bits are incorporated in a dry pre-mix, then an additional problem is presented in that the particles must not wick, discolor or change their form during storage and shipment. A conventional chocolate particle is prone to lose part of its fluid ingredients through wicking or bleeding at ordinary temperatures. In tropical areas, the effect is accelerated and the chocolate coloration greys or darkens a light-colored product such as cake and the remaining chocolate bit becomes a tasteless and crumbly particle.

Pure melted chocolate consists of a dispersion or fine suspension of solid particles in a liquid which is capable of setting to a brittle solid. The cocoa bean from which chocolate is manufactured contains cocoa solids and cocoa butter, all of which is ground into a mass which is capable of melting and solidifying as noted. When solidified, the surface of a pure chocolate particle has a continuous film of pure cocoa butter thereover. Adding in conventional practice shortening, sugar, milk, flavoring agents and the like may alter the characteristics of pure chocolate to some degree but do not correct the wicking action which permits the chocolate liquids to pass out of the chocolate particle and into the dry product with which it is associated. The wicking action of the conventional chocolate bit is also aggravated by the presence of shortening in a dry mix in which the chocolate bits are incorporated. Thus, light colored cake mixes in which the shortening has been incorporated will readily discolor and pick up the liquid components of the chocolate bit with the previously noted disadvantages.

Experiments have been conducted with the object of coating chocolate bits to render them impervious to wicking and to strengthen each particle so that, when exposed to ordinary room temperature or higher temperatures, the chocolate bit will have sufficient structural strength to resist disruption and exposure of the soft pure chocolate center. Coating the chocolate bit with edible shellac and the like may render the bit impervious to moisture but does not give it structural rigidity to prevent rupture of the water-resistant shell. As a consequence, the idea of coating the chocolate particle with a hard sugar coating has been tried and it has been found that good structural rigidity can be imparted to the chocolate bit which will be sufficient to resist rough handling during packaging and shipping of a food pre-mix into which the sugar-coated particles have been incorporated.

There are, however, several disadvantages noted in the use of chocolate bits or particles for the purpose described which have been covered with an adequately strong sugar coating. One of these disadvantages is the alteration of the cake and flavor of the chocolate bit in the food product. For example, a cake utilizing a sugar-coated chocolate bit has a flavor and texture suggesting a chocolate-flavored hard candy and does not impart the effect of a soft chocolate bit which is desired and characterized by "Toll House" cookies and other freshly made products having the chocolate particles incorporated therein. Furthermore, the chocolate bit with the structurally strong sugar shell does not present a chocolate appearance but, rather, gives the impression of a hard candy not having a pleasing color contrast in a light-colored food product. Still further, the sugar-coated particle, although it is strong and will maintain a non-sticking relationship with other particles prior to incorporation in a pre-mix, may, upon subjection to atmosphere below the dewpoint, become weakened and sticky. Such a particle will then often crack when exposed to temperatures above 100° Fahrenheit. Once the continuity of the hard shell is destroyed, the protection is completely lost and the previously noted wicking of chocolate liquids will occur. The usefulness of the hard sugar-coated chocolate bit is, therefore, limited to situations where moisture and temperature will not effect each particle to such a degree that the continuity of the shell will be destroyed. The disclosure of the manufacture and use of a chocolate bit in a pre-mix composition wherein the bit is encased in a sugar shell is disclosed and claimed in co-pending application, Serial Number 454,602, filed September 7, 1954, now abandoned. Subsequent to the filing of said co-pending application, it has been determined that, although the strength of the sugar shell is more than adequate under normal conditions, the effect of moisture and temperature is such as to render the product unfit for some usages and particularly those in which the moisture conditions and warm temperatures are encountered.

The present invention contemplates overcoming the above noted disadvantages and it is a general object of the invention to provide a prepared chocolate bit and food pre-mix containing a multiplicity of such bits, in which the original identity of the bit will be preserved in the presence of warmth and moisture.

More specifically, it is an object of the invention to prevent wicking of chocolate liquors from a chocolate-center bit or particle to the outer surface thereof and to preserve the particle in discrete form without distortion or fusion with other particles.

It is a still further object of the invention to provide a chocolate bit or particle which can be incorporated in a pre-mixed food product and will have good taste and appearance when so incorporated.

It is a still further object of the invention to provide a chocolate food composition in discrete particle form which will have no adulterants in its composition but which will conform to the legal definition of sweet chocolate without having the attendant disadvantages of conventional sweet chocolate when utilized in dry pre-mixed food products.

These and other objects will be more apparent from the following description of my method and composition:

Figure 1 is a side elevation of an enlarged chocolate bit made in accordance with the invention;

Figure 2 is a horizontal section of the enlarged particle shown in Figure 1 and taken on the line 2—2;

Figure 3 is a further enlarged fragment of a section through the shell structure showing how consecutive layers have been provided over the inner pure chocolate center.

In the manufacture of the chocolate product disclosed hereon, a pure sweet chocolate center is provided and is preferably in the form of a flattened droplet such as is produced commercially by depositing molten chocolate particles on a hard surface whereupon they are allowed to cool and crystallize in the form noted. The particles are tumbled in a coating pan which rotates and provides an intimate folding and admixture of the discrete chocolate particles. A measured quantity of sugar syrup is then placed in the pan the chocolate particles are twinned in conventional manner, the flattened areas of each of the chocolate bits being adhered with the flattened part of another chocolate bit to form a couplet. When the twinning operation is complete, powdered sugar is placed in the rotating pan and a quantity of moisture present in the sugar syrup will be absorbed thereby so as to dry and harden the sugar coating on each of the twinned particles. The sugar syrup and powered sugar may be applied several times but it is not attempted to build up an unduly thick sugar coating in an attempt to compensate for moisture and temperature conditions. It is merely sufficient to have a hardened coating of moderate thickness which will lend structural strength to the softer inner mass so as to prevent distortion and rupture of the particle during handling and usage thereof.

After the chocolate center is coated with the built-up, hardened sugar shell, a chocolate syrup comprising chocolate liquor, non-fat milk solids, sugar and water is added to the pan which continues in its rotation. When the particles have become thoroughly coated with the chocolate syrup, dry powdered substance comprising the same ingredients as the outer coating are then placed in the pan to absorb water from the chocolate syrup in much the same manner as the powdered sugar dried and hardened the inner sugar shell. Here again, the steps may be repeated several times to build up an outer chocolate shell. This outer shell is considerably thicker than the sugar shell and, once thhe water has been reduced through drying, will present a water-resistant coating to protect the inner sugar coating.

The appearance of the completed particle is illustrated in Fig. 1, wherein such particle is indicated generally as 10. Fig. 2 shows a pair of twinned chocolate bits 11 separated and completely encased by a hardened sugar shell 12. The outermost layer 13 is composed of the dried chlocolate syrup and is substantially thicker than the inner sugar shell, a ratio of about ⅔ to ⅓ providing a desirable proportion within the total shell coating surrounding the inner soft centers 11.

It has been found that multiple alternate layering of sugar and chocolate syrup, as described, produces a stronger and more resistant particle and makes structural build up possible without giving the particle a taste and texture of hard candy. Referring to Fig. 3, the soft twinned chocolate center is coated with a sugar coating 12a which completely encases the center and is dried and hardened with a powdered sugar coating 12b. Several alternate sugar coatings may be applied but for simplification only one additional pair of sugar syrup coating 12a and powdered sugar coating 12b is illustrated in Fig. 3 to complete the sugar inner shell 12. Similarly, several pairs of chocolate syrup coatings 13a, each dried with chocolate composition 13b, is applied in completely encasing manner to form chocolate outer shell 13. The outermost shell 13, of course, consists of a dried chocolate syrup layer 13b so that the appearance and texture of the particle will connote chocolate rather than hard candy.

As to specific formulation of the chocolate particles according to this invention, the basic material constitutes chocolate bit centers and 100 pounds of such centers has been selected as a representative batch. The composition of the chocolate bit center utilized is conventional and is substantially as follows:

| | Percent |
|---|---|
| Chocolate liquor | 29.995 |
| Sucrose | 48.655 |
| Added cocoa butter | 12.164 |
| Non-fat milk solids | 9.077 |
| Lecithin | 0.125 |
| Ethyl vanillin | 0.023 |
| | 100.000 |

The lecithin is a stabilizer and emulsifier and the ethyl vanillin is a flavoring agent.

For the 100 pound batch of chocolate bit centers, four pounds of 65% sugar (sucrose) syrup is added for twinning the bits and the hardened sugar layer is produced by drying with six and eight-tenths of powdered sugar. Two pounds of 65% sugar syrup is then added in several increments and each time dried with a portion of an additional seven pound charge of powdered sugar. From three to five alternate layers of sugar syrup followed by a drying coating of powdered sugar has been found to give results. When completed, the sugar shell will contain a total of eight pounds of 65% sugar syrup and twenty-one pounds of powdered sugar. The total ratio is, therefore, twenty-six pounds of pure sucrose solids to 100 pounds of chocolate centers.

The softer water-resistant outer coating is then applied to the previously formed sugar coated particles. A mixture consisting of approximately 51% sucrose, 25% chocolate liquor and 24% non-fat milk solids is then thoroughly milled into a pulverulent powder and thirty-seven pounds of the milled mixture is utilized for the previously mentioned 100 pound batch of chocolate centers. Sixteen and one-half pounds of a liquid chocolate syrup is then prepared and this consists of approximately 54% sucrose, 5.4% chocolate liquor, 13.5% non-fat milk solids, 27% water and approximately ⅒% ethyl vanillin. The syrup ingredients are blended and brought to a temperature of 212° Fahrenheit and are held for ten minutes. The resulting syrup is smooth and free from lumps and should have a viscosity of 45± 5° Mac-Michael. The cholocate syrup is then applied to the previously sugar-coated chocolate particles in a series of laminations, applying about ⅙ of the syrup for each of the laminations in the outer water-resistant shell, the particles being tumbled all the while in the coating pan. After each application of chocolate syrup, a pro rata portion of the pulverulent chocolate compound is utilized to dry and harden to some degree the chocolate syrup coating. When the last lamination in the outer coating has been applied, the particle will appear in cross section as in Fig. 2. Considering the coating alone, the total composition is as follows:

| | Percent |
|---|---|
| Chocolate liquor | 12.917 |
| Sucrose | 72.397 |
| Non-fat milk solids | 14.663 |
| Ethyl vanillin | 0.023 |
| | 100.000 |

Where my procedure is carried out, the composition of the entire coated bit or particle is as follows:

| | Percent |
|---|---|
| Chocolate liquor | 22.654 |
| Sucrose | 58.830 |
| Added cocoa butter | 6.951 |
| Non-fat milk solids | 11.471 |
| Lecithin | 0.071 |
| Ethyl vanillin | 0.023 |
| | 100.000 |

It will be noted that the total composition lies within permissible ingredients and percentages of the legal definition of sweet chocolate, yet the product is non-wicking, structurally strong and has the appearance and taste of conventional sweet chocolate.

What I claim is:

1. A chocolate particle for use in a pre-mixed food product which comprises a pure chocolate center mass, an inner hardened sugar shell intimately applied in complete encasement around the center mass and a relatively softer outer shell formed in complete encasement about the sugar shell and composed of chocolate liquor, non-fat milk solids and sugar, said inner shell being constructed of alternate consecutive layers of sugar syrup and powdered sugar, and said outermost shell being constructed of alternate layers of a syrup composition and a powdered composition.

2. A chocolate particle for use in a pre-mixed food product which comprises a pure chocolate center mass, a hardened sucrose shell formed in complete encasement around the center mass, and an outer relatively softer shell formed in a complete encasement about the sucrose shell consisting of an intimately mixed dried syrup of chocolate liquor, non-fat milk solids and sucrose.

3. The subject matter as set forth in claim 2 wherein the relatively softer outer shell is substantially thicker than the inner hardened sugar shell.

4. A chocolate particle for use in a pre-mixed food product which comprises a pure chocolate center mass capable of melting and wicking, a water soluble hardened sugar shell completely encasing said center mass, and an outermost water-resistant shell completely encasing said inner sugar shell and consisting of chocolate liquor, non-fat milk solids and sugar, said outermost shell being relatively thicker and softer than the sugar shell.

5. A chocolate particle for use in a pre-mixed food product which comprises a pure chocolate center mass, an inner hardened sugar shell intimately applied in complete encasement around the center mass and an outer shell formed in complete encasement about the sugar shell and composed of chocolate liquor, non-fat milk solids and sugar, said inner shell being constructed of alternate consecutive layers of sugar syrup and powdered sugar, and said outer shell being relatively softer and thicker than the inner shell.

6. A chocolate particle for use in a pre-mixed food product which comprises a pure chocolate center mass, an inner hardened sugar shell intimately applied in complete encasement around the center mass and a relatively softer outer shell formed in complete encasement about the sugar shell and composed of chocolate liquor, non-fat milk solids and sugar, said outer shell being constructed of alternate layers of a syrup composition and a powdered composition, and said inner shell being relatively thinner and harder than said outer shell.

References Cited in the file of this patent

UNITED STATES PATENTS

| 364,332 | Barnes | June 7, 1887 |
| 1,127,114 | Thompson | Feb. 2, 1915 |
| 2,062,867 | Cosler | Dec. 1, 1936 |
| 2,181,109 | Dodge | Nov. 21, 1939 |

OTHER REFERENCES

"Confectionery Standards" by Jordan, 1933, Applied Sugar Laboratories, Inc., 109 Wall St., New York, pp. 298 and 299.